(12) United States Patent
Wang (10) Patent No.: US 6,449,625 B1
(45) Date of Patent: Sep. 10, 2002

(54) USE OF A TWO-WAY STACK APPROACH TO OPTIMIZE FLASH MEMORY MANAGEMENT FOR EMBEDDED DATABASE SYSTEMS

(75) Inventor: Jay Wang, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/295,198

(22) Filed: Apr. 20, 1999

(51) Int. Cl.[7] .......................... G06F 17/30; G06F 12/00
(52) U.S. Cl. ...................... 707/206; 711/103; 711/133; 711/159
(58) Field of Search .................... 707/205, 206; 711/100–106, 111–114, 132–136, 159, 160

(56) References Cited

U.S. PATENT DOCUMENTS

| | | | | |
|---|---|---|---|---|
| 5,592,669 A | * | 1/1997 | Robinson et al. | 707/206 |
| 5,640,349 A | * | 6/1997 | Kakinuma et al. | 365/185.33 |
| 5,687,368 A | * | 11/1997 | Nilsen | 707/103 |
| 5,734,611 A | * | 3/1998 | Kim et al. | 365/185.33 |
| 5,765,175 A | * | 6/1998 | Needham et al. | 707/206 |
| 5,832,493 A | * | 11/1998 | Marshall et al. | 707/101 |
| 5,873,105 A | * | 2/1999 | Tremblay et al. | 707/206 |
| 5,993,845 A | * | 11/1999 | Geerts et al. | 424/423 |
| 6,076,138 A | * | 6/2000 | Shin | 711/103 |
| 6,185,581 B1 | * | 2/2001 | Garthwaite | 707/206 |
| 6,209,003 B1 | * | 3/2001 | Mattis et al. | 707/206 |

FOREIGN PATENT DOCUMENTS

| | | | |
|---|---|---|---|
| JP | 61264456 | * | 11/1986 |
| JP | 02022745 | * | 1/1990 |

\* cited by examiner

*Primary Examiner*—Maria N. Von Buhr
(74) *Attorney, Agent, or Firm*—Darby & Darby (57) ABSTRACT

A method and system for storing data in data blocks of predetermined size in an electronic memory (e.g. FLASH memory), particularly data such as updatable record of database transactions. The FLASH operates logically as two stacks where data is pushed into either end of the memory in alternating cycles. Between each push or write cycle, a garbage collection cycle is performed whereby only the most recent transaction performed on any particular record is preserved at one end of the stack, while the rest of the stack is made available for new data. When database being monitored is written to permanent memory, the entire FLASH is again made available for new data. If the database is periodically backed up to permanent memory, it can be restored to RAM by reducing the copy from the permanent memory and modifying it according to the record of database transactions in the electronic memory.

25 Claims, 4 Drawing Sheets

| | |
|---|---|
| 1 | |
| 2 | |
| 3 | |
| 4 | |
| 5 | |
| 6 | |
| 7 | |
| 8 | |
| 9 | |
| 10 | |

| | |
|---|---|
| 1 | INSERT(5,r) |
| 2 | UPDATE(5,r) |
| 3 | INSERT(1,r) |
| 4 | UPDATE(1,r) |
| 5 | UPDATE(3,r) |
| 6 | DELETE(2) |
| 7 | INSERT(8,r) |
| 8 | UPDATE(3,r) |
| 9 | UPDATE(8,r) |
| 10 | |

| | |
|---|---|
| 1 | INSERT(5,r) |
| 2 | UPDATE(5,r) |
| 3 | INSERT(1,r) |
| 4 | UPDATE(1,r) |
| 5 | UPDATE(3,r) |
| 6 | DELETE(2) |
| 7 | INSERT(8,r) |
| 8 | UPDATE(3,r) |
| 9 | |
| 10 | UPDATE(8,r) |

| | |
|---|---|
| 1 | INSERT(5,r) |
| 2 | UPDATE(5,r) |
| 3 | INSERT(1,r) |
| 4 | UPDATE(1,r) |
| 5 | UPDATE(3,r) |
| 6 | DELETE(2) |
| 7 | INSERT(8,r) |
| 8 | |
| 9 | UPDATE(3,r) |
| 10 | UPDATE(8,r) |

| | |
|---|---|
| 1 | INSERT(5,r) |
| 2 | UPDATE(5,r) |
| 3 | INSERT(1,r) |
| 4 | UPDATE(1,r) |
| 5 | UPDATE(3,r) |
| 6 | DELETE(2) |
| 7 | |
| 8 | |
| 9 | UPDATE(3,r) |
| 10 | UPDATE(8,r) |

| | |
|---|---|
| 1 | INSERT(5,r) |
| 2 | UPDATE(5,r) |
| 3 | INSERT(1,r) |
| 4 | UPDATE(1,r) |
| 5 | UPDATE(3,r) |
| 6 | |
| 7 | |
| 8 | DELETE(2) |
| 9 | UPDATE(3,r) |
| 10 | UPDATE(8,r) |

| | |
|---|---|
| 1 | |
| 2 | |
| 3 | |
| 4 | |
| 5 | |
| 6 | UPDATE(5,r) |
| 7 | UPDATE(1,r) |
| 8 | DELETE(2) |
| 9 | UPDATE(3,r) |
| 10 | UPDATE(8,r) |

S=[8,3,2,1,5]

US 6,449,625 B1

USE OF A TWO-WAY STACK APPROACH TO OPTIMIZE FLASH MEMORY MANAGEMENT FOR EMBEDDED DATABASE SYSTEMS

FIELD OF THE INVENTION

The present invention relates to methods for storing data in FLASH memory and, more particularly, to methods for optimizing the use of FLASH memory in database systems.

BACKGROUND OF THE INVENTION

FLASH memory is a portable, high capacity storage unit capable of maintaining stored data memory units, however, it allows data to be updated only in blocks of predetermined size which is usually 64K bytes or larger. Accordingly, achieving a high storage efficiency when using FLASH memory as a database backup device is problematic in that a change to any particular data requires that the entire block containing that data be erased and rewritten. Compounding the problem is the fact that the flash memory is rated for a limited number of write cycles, and so frequent database updates can shorten the life of the FLASH memory unit. The invention addresses these and other problems.

SUMMARY OF THE INVENTION

It is accordingly an object of the present invention to provide a system and method for efficiently and optimally using FLASH memory as a data backup device for a database application. The data in the database are organized in a collection of logical data units called records.

According to one aspect of the invention, a method for storing data in memory blocks in an electronic or FLASH memory comprises the steps of writing records into addressably contiguous memory blocks of the FLASH device, and after writing to a predetermined memory block, performing a garbage collection cycle on the memory blocks so as to preserve non-superfluous data and to reclaim memory used by stale data. The data writing and garbage collection cycles are performed in addressably opposite directions.

In a garbage collection cycle each individual record in FLASH is checked to see if it contains the latest version of the data for the record. If it is the latest version, the data is new and is retained. Otherwise, the data is 'stale' and is evoked as unnecessary or garbage because a later version of the record already exists in the FLASH memory.

According to another aspect of the invention, a method for writing data to an electronic or FLASH memory logical stack comprises the step of pushing data onto a first logical stack until a predetermined block is filled and then performing a garbage collection cycle on that data in the same direction as the direction in which the data was pushed onto the stack. The preserved data after being popped from the first logical stack is pushed onto a stack whose opening faces a direction opposite that of the first stack.

Data recoverbility is achieved by logging database transactions to FLASH memory. These transactions are logged by writing transactions to contiguous blocks of FLASH memory in either an addressably sequential or an addressably reverse sequential manner. For the purpose of discussion, let us refer to the memory blocks that have the highest and the lowest address space as the 'high-end' and 'low-end' blocks of the Flash memory, respectively. Initially, transactions are written to FLASH memory starting from the low end toward the high end. Once these transactions occupy every block but the high-end block, a garbage collection cycle is performed. During the course of garbage collection, the previously written transactions are examined in a sequence opposite to the order they were written. These transactions are examined to identify transactions containing stale date, which are then discarded. The preserved data (i.e., the clean data that contain the latest version) will be stored in FLASH memory starting from the high-end block toward the low end. The transaction examination and the writing of the preserved data are preformed concurrently. Every time, when all the transactions in a block are processed, the entire block is erased to ensure there is always available memory space for writing the preserved data. This process continues until all the transactions in the FLASH memory are processed when the garbage collection cycle is completed. Another write cycle may start and new transactions can again be written to the FLASH memory starting from the available space following the preserved data written previously toward the low end. The write cycle continues until all but the low-end block is filled. At this point, another garbage collection cycle is commenced, this time from low-end to high-end.

This procedure may continue in such alternating manner until the database is backed up to an external permanent storage (e.g., a hard disk drive), at which point the entire FLASH is made available for a new write cycle. In a special case where the system does not have an external permanent storage, this alternating procedure can proceed indefinitely. However, in such case the size of the FLASH memory has to be large enough to accommodate the entire database and the logging overhead.

Viewed logically, the present method models a FLASH memory as a 'two-way stack' which is a combination of two logical stacks facing opposite directions that operate on one physical FLASH memory. Initially, transactions are pushed onto the first stack until only one block remains empty, at which point garbage collection commences. During the garbage collection cycle, transactions are 'popped' from the first stack and examined and preserved data is pushed to the second stack from the other end of the memory, i.e., the opening of the second stack faces a direction opposite that of the first stack. Once the garbage collection cycle terminates, new transactions are pushed into the second stack on top of the preserved data again until all but one block is filled. At this point a new garbage collection cycle commences. Transactions are again popped from the stack and examined. The push/garbage collection processes proceed in this alternating cycle continuously until the applicable database is written to permanent storage.

The system presented comprises a logical processing unit, a power-dependent primary memory unit, a FLASH memory unit, and a permanent storage unit or facility. The logical processing unit controls all functional aspects of the system. A real time version of the database resides in the power-dependent primary memory unit (e.g. RAM) while another copy of the database resides on a permanent storage device (e.g. hard disk drive.) The logical processing unit alternately pushes data into the two oppositely facing logical stacks of FLASH memory performing a garbage collection cycle between each series of pushes. At some predetermined point, the entire database resident in the power-dependent memory unit is written to a permanent storage device and all blocks of the FLASH memory can be made available for new data.

BRIEF DESCRIPTION OF THE DRAWINGS

Other objects and features of the present invention will be described hereinafter in detail by way of certain preferred embodiments with reference to the accompanying drawings, in which.

DETAILED DESCRIPTION OF THE INVENTION

The preferred embodiment of the present invention implements a system and method for optimizing the use of FLASH memory in database systems, such as database systems which utilize FLASH memory as backup storage for database transaction logs.

Figure 1:
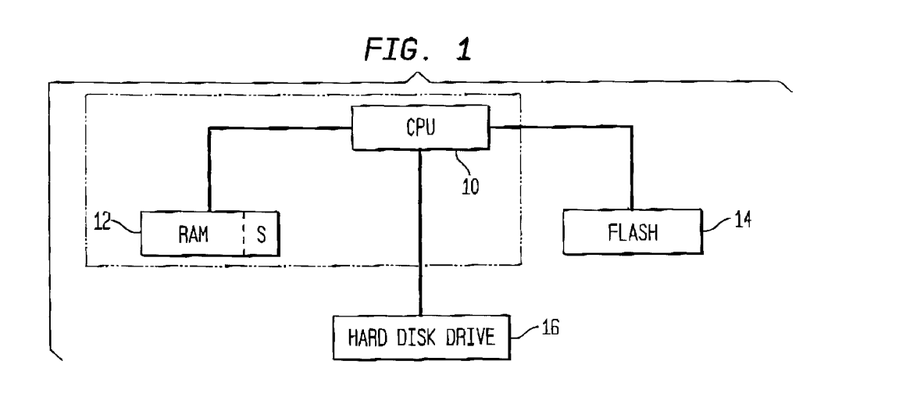
FIG. 1 represents the various elements of a system for optimizing FLASH memory management according to the present invention.

FIG. 1 illustrates one system which utilizes the present invention. A central processing unit (CPU) 10 controls a primary random access memory (RAM) 12, a hard disk drive 16 and a secondary FLASH memory 14. The CPU 10 controls and directs all intelligent operations of the system including the flow of data between and among the storage devices 12, 14, 16. The CPU 10 also controls all read and write cycles to all storage devices. The system may utilize any central processing unit known in the art, and may alternatively utilize more functional-specific CPUs related to embedded systems, such as digital signal processors (DSPs), microcontrollers or application specific integrated circuits (ASICs). Likewise the system may utilize any random access and FLASH memories or any mass storage devices (e.g. hard disks or optical disks).

In the present embodiment, the CPU 10 runs a database program which alternately updates, inserts and deletes records from a database as required. The database upon which the CPU 10 acts is preferably stored in primary memory RAM 12. Because RAM 12 is erased when power is lost, the database is also periodically written to a permanent storage device, such as the hard disk drive 16, to protect against data loss due to power failure. Alternatively, a portion of the FLASH memory 14 may be used as the permanent storage device. Constantly writing the contents of the database to the hard disk drive, however, is time consuming and is generally avoided by skilled programmers. Thus, the CPU will backup the entire database to a hard disk drive only at some predetermined time interval, e.g. every 5 minutes, as may be set by the user by balancing the need to protect data with the time associated with each back-up. Upon a power failure, therefore, in systems which do not utilize FLASH memory as a backup device, any updates, inserts or deletes written to the database, since the last complete write (backup) of the database to the hard disk drive, will be lost.

In the system illustrated in FIG. 1, the secondary FLASH memory 14 is used as a backup storage device. FLASH memory devices are advantageous in such applications because they are capable of storing their contents after losing power. Lacking mechanically moving parts, they provide the further advantages of (1) fast read and write operation cycles which far exceed those of a hard disk drive and (2) low power consumption. Accordingly, a FLASH device provides an ideal solution to the problem of providing backup for a database system which constantly updates, inserts and deletes records.

FLASH memory has the disadvantage, however, of allowing data to be erased only in blocks of a predetermined size. For example, a FLASH memory module may allow data to be erased only to 64,000 or 256,000 byte blocks. To change the contents of any byte within a block requires that the entire block be erased and rewritten. As a result, without careful use and planning, the storage efficiency of FLASH memory can approach very low percentages, especially, when the size of the data being written are significantly smaller than the size of the blocks.

In the present embodiment, the FLASH memory 14 logs database transactions performed upon the database rather than storing a copy of the database. The task of maintaining a copy of the database is relegated to the primary RAM 12. Accordingly, when a database record must be updated, the CPU first searches the physical location of the applicable record in RAM 12 and then physically changes its contents in accordance with the new information. The CPU then writes a copy of the transaction just performed on the database to the next available memory space in FLASH memory.

The three types of transactions written to the FLASH memory each represent the common database operations of insert, update and delete. For an insert operation, the transaction appears as <insert[record_id, record]>, for an update operation, the transaction appears as <update[record_id, record]> and, finally, for a delete operation, the transaction is <delete[record_id]>. In each operation, the variable record_id represents an integer or unique identification unit identifying the record itself and the variable record represents the contents of the information written to the record. The delete operation simply requires that the record_id be recorded.

Figure 2:
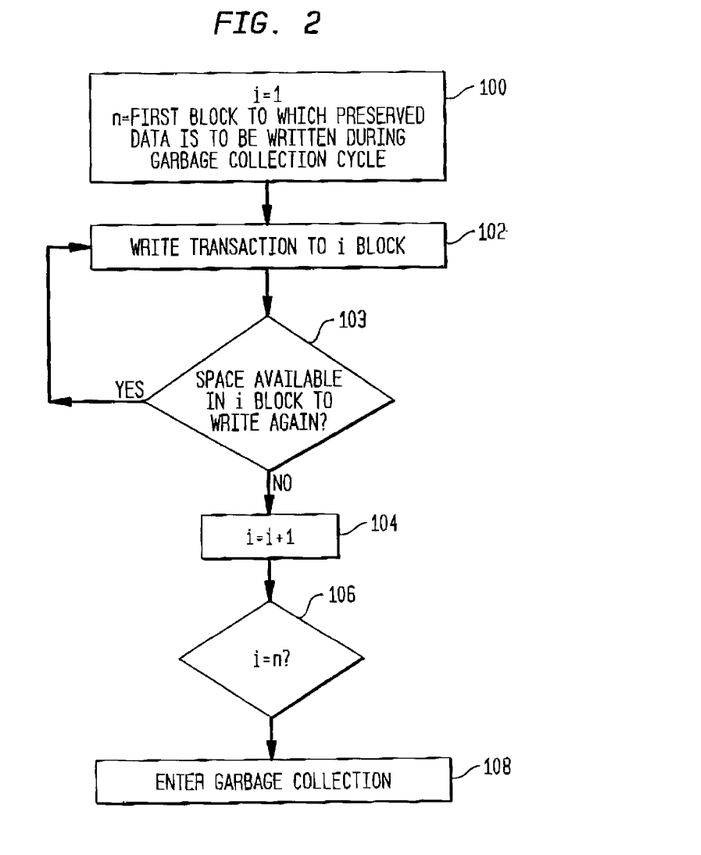
FIG. 2 is a flowchart illustrating the method of writing database transactions to FLASH memory.

The process begins by writing each transaction to FLASH memory 14 starting with the numerically addressable first block and continuing to log to sequential ordered contiguous blocks until the penultimate block is filled. After the penultimate block is filled, a garbage collection cycle is initiated. FIG. 2 which illustrates the transaction writing process is fully explains in the following description.

Each write cycle is followed by a garbage collection cycle.

Figure 3:
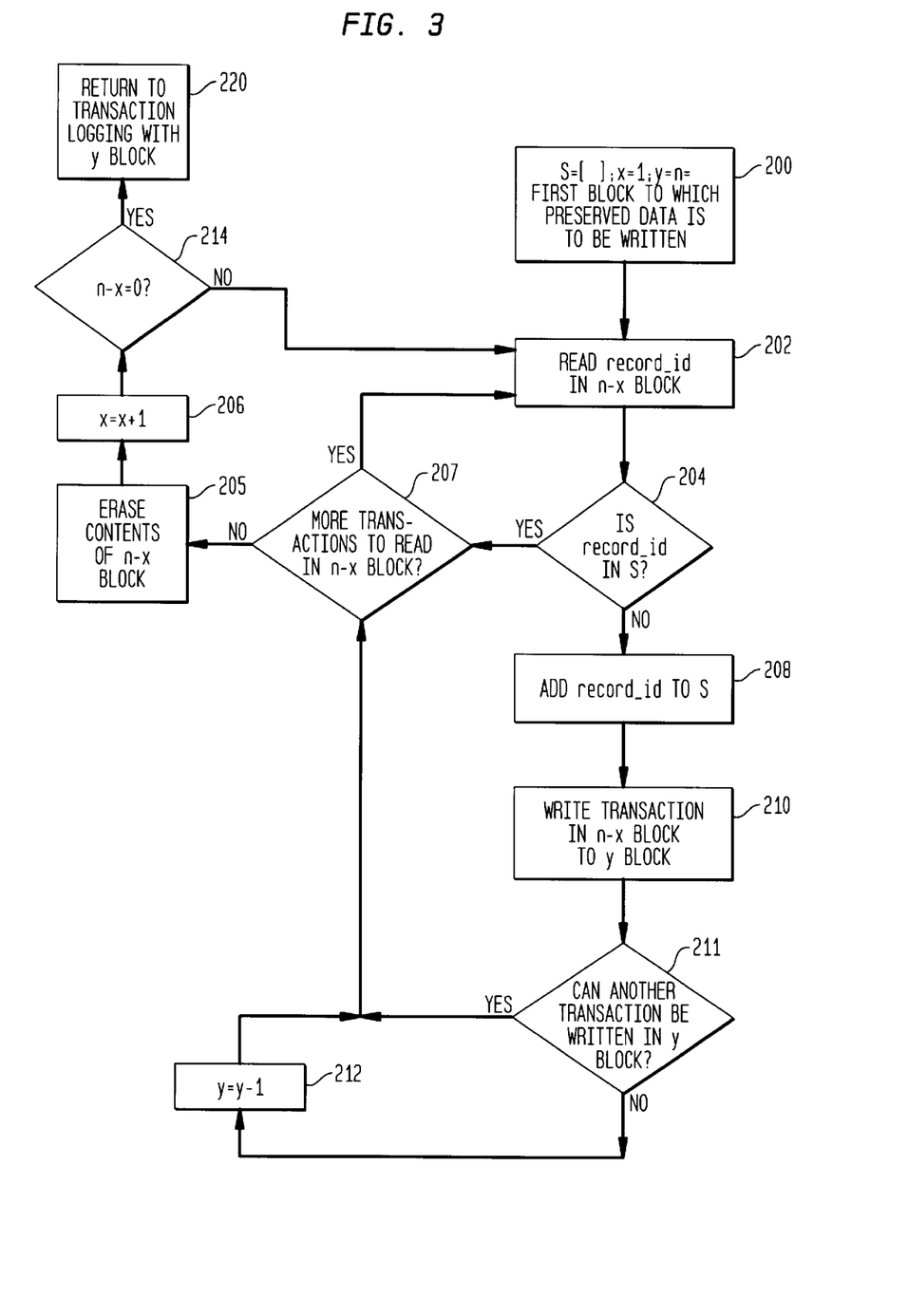
FIG. 3 is a flowchart illustrating the method of performing a garbage collection cycle on data written to FLASH memory.

The purpose of the garbage collection cycle is to review all of the transactions currently stored in the FLASH memory and to only maintain or preserve records of those transactions that represent the most recent action performed on any particular record. The garbage collection cycle begins with the penultimate block (i.e. the block of FLASH memory with the numerically second highest starting address) and proceeds in reverse sequential order. By proceeding in reverse sequential order with respect to the last write cycle performed, the garbage collection cycle is assured that the first transaction encountered for any particular record is the most recent transaction performed on that particular record. This is due to the fact that the records were initially logged in sequential order. Each time the first instance of any particular record is encountered by the garbage collection cycle, that record is written to the first available block containing sufficient storage space in a reverse sequential order. The block in which that transaction previously resided is then made available for a subsequent write operation. Any subsequent transaction of a record which has already been encountered can be discarded. FIG. 3 which illustrates the garbage collection process is fully explained in the following description.

In conjunction with these functions in accordance with an aspect of the invention, there is provided an array S which provides necessary functionality during the garbage collection cycle. The array S is a temporary area of memory contained in RAM 12 (as shown in FIG. 1). Array S maintains a set of the record identities (record_id) for all transactions that have been encountered during the garbage collection process. S requires a relatively small amount of memory in that each record_id is recorded only once in S when it is first encountered. S is referenced by the CPU 10 during the garbage collection cycle each time a new transaction is encountered in order to determine whether that particular transaction is the most recent modification of a particular record.

Once garbage collection has been performed on all of the blocks, new transactions can be written to the FLASH memory, following the preserved data written during the previous garbage collection cycle until all but one block is filled and a garbage collection is again performed.

It is to be understood that for explanatory purposes the blocks of the FLASH memory are presumed to be addressed in numerically linear sequential order (i.e., 1, 2, 3) starting from the number 1 as in the process illustrated in FIGS. 2 and 3. The steps, variables and constants used in FIGS. 2 and 3 follow accordingly. Of course, the addressing of FLASH memory blocks may be more complex in that said addresses may not begin with the number 1, the sequence may not proceed in multiples of 1 (e.g. 4, 6, 8, 10 . . .), or, at certain points in the sequence, the addresses of the blocks may jump out of contiguous order (e.g. 1, 2, 3, 11, 12, 13, 14 . . .). Such differences are to be expected due to manufacturing imperfections or vendor specificity. In such instances, the programmer may make the applicable adjustments in the appropriate steps of the procedures illustrated in FIG. 2 and 3 in accordance with known methods in the art.

The detailed flowchart of FIG. 2 illustrates an efficient method of writing such transactions to FLASH memory. In this flow chart, i represents the address of the current FLASH block and n represents the address of the first block in FLASH memory to which preserved data will be written during the garbage collection cycle. In sequential logging, n represents the total number of blocks in the FLASH memory because the last block of FLASH will be the first block to which preserved data is written during reverse order garbage collection. These variables may be stored in primary RAM 12 or in a registry of CPU 10. At the beginning of the process, the FLASH memory is blank (i.e. no data has been written to any blocks) and i is set to 1 (step 100.) Upon the first action performed on the database, the CPU issues a WRITE command to the FLASH memory in the form <update[record_id, record]>, <insert[record_id, record]>, or <delete[record_id]> depending on the transaction. The transaction is written into the block of the FLASH memory (step 102.) If sufficient space remains in the ith block to store another transaction (step 103), the CPU returns to step 102. Otherwise, the value of i is then incremented by 1 (step 104) and the new value of i is compared to n (step 106.) If i is not equal to n, the database program continues to log transactions (step 102.)

The CPU continues writing transactions to the FLASH memory in sequential order until the penultimate block is filled, i.e. until i=n. At this point, all but the final block of FLASH memory will have had a transactions written on it. The CPU now initiates a garbage collection cycle (step 108.)

The detailed flow chart of FIG. 3 illustrates an efficient method of performing a garbage collection cycle. The garbage collection cycle begins by creating two integer variables x and y (step 200.) x is initially set to 1, y is initially set to n. The variable n is equal to the first block of FLASH memory to which preserved data is to be written during the next garbage collection cycle. In the case of sequential logging, n is equal to the total number of blocks on the FLASH memory. Again, these variables can be stored in either RAM 12 memory or in CPU 10 register memory. x is used as a counter to identify the current block upon which garbage collection is to be performed. y is likewise used as a counter to determine the location of the block upon which the next transaction determined to be the most recent is written. Finally, an empty array of integer variables S is created. S is used to store the value of record_ids which have been encountered during the garbage collection cycle.

Continuing with the process shown in FIG. 3, the CPU begins reading the transaction logged in the n-x block of FLASH memory (step 202.) The CPU does not read the contents of the entire transaction, but reads only the record_id of the transaction. In particular, the CPU compares the value of the record_id with the variable array of integers S (step 204.) If the record_id is in S, the transaction is ignored and if no more transactions are left to be read in the n-x block (step 207) the n-x block is erased (step 205) and the value of x is incremented by 1 (step 206.) The value of n-x is then computed (step 214.) If n-x is equal to 0, then garbage collection has been performed on all of the blocks of FLASH memory and control is passed back to the transaction logging program (step 220) so that new transactions can be written to the blocks starting with y block.

If, however, the record_id of the transaction logged in the n-x block is not in S (step 204), the record_id is written in S (step 208.) The entire transaction is then written to the y block (step 210.) The value of y is decreased by 1 (step 212) if no more transactions can be written to the y block (step 211) and the value of x is increased by 1 (step 206.) As above, the CPU then checks the value of n-x (step 214.) If n-x=0, then garbage collection has been performed on all of the blocks of FLASH memory and control is passed back to the transaction logging program (step 220) so that new transactions can be written to the blocks starting with y block, but in reverse sequential order.

The process of logging the transactions in reverse sequential order is performed in substantially the same manner as demonstrated by the flowchart of FIG. 2 with only slight modifications. In step 100, the variable i, which represents the identification of the first empty block of FLASH data to which a transaction can be written, is set. It represents the first block to which the first new transaction will be logged, taking into consideration the preserved blocks of data. The variable n, which represents the block number of the first block of FLASH memory to which data will be written during the subsequent garbage collection cycle is set to 1 because, upon completion of the reverse sequence logging, the new garbage collection cycle will write the preserved data to contiguous sequential blocks of FLASH memory starting with the first block. Additionally, the process for reverse order logging requires that step 104 in FIG. 2, which moves the index or pointer pointing to the next block available for a WRITE operation, be rewritten. In reverse sequential logging, each subsequent WRITE must be made to a lower ordered block as opposed to a higher ordered block, which is the case in sequential logging, such that step 104 is i=i-1. When the $2^{nd}$ block in FIG. 4(*g*) is filled, a new garbage collection cycle will begin, this time proceeding in sequential order starting with the second block.

The sequential order garbage collection cycle is performed in substantially the same manner as the reverse-order garbage collection cycle demonstrated by the flowchart in FIG. 3 with only slight modifications. In step 200, the variables y and n representing, respectively, the pointer used to identify the next block to which data can be written during the garbage collection cycle and the first block to which preserved data is written during the garbage collection cycle are initially set to 1 since the sequential garbage collection cycle proceeds from the first block as opposed to the reverse order sequential garbage collection cycle which proceeds from the last block of FLASH memory. Step 202 is modified to read the n+x block as opposed to the n−x block, because, again, the garbage collection cycle is proceeding in sequential order. Similarly, in step 211, the variable y is incremented by one (i.e., y=y+1) as opposed to decremented so as to move the pointer to a sequentially higher block during sequential garbage collection. In a similar fashion, step 205 erases the contents of the n+x block (rather than the n−x block). Finally, step 214 is modified to compare the value of n+x (which represents the last block upon which garbage collection was performed) to the value of 10, which in the present example represents the last block upon which the sequential garbage collection cycle would be performed. Of course, if there were more than 10 blocks in a particular FLASH memory, the value of n+x would be compared to the particular size of that FLASH memory in step 214 in order to determine whether the sequential garbage collection cycle can terminate.

At the completion of reverse sequential order garbage collection, new transactions are logged according to the method represented in FIG. 2, of course modifying applicable variables such that new data is not written over preserved data. Alternating cycles of logging transactions and performing garbage collection on the logged transactions continues in this manner (i.e. sequential logging followed by reverse sequential garbage collection followed by reverse sequential logging followed by sequential garbage collection, followed by sequential logging, etc.) indefinitely for the duration of the database modification procedure until the applicable database is written to a permanent storage device 16.

The procedures illustrated in FIGS. 2 and 3 and the accompanying modifications described above can be implemented using any known programming language (e.g., C, C++, Pascal) in accordance with any known programming techniques. The exact manner in which such code is implemented is dependent upon the programmer and various programming techniques can be used to achieve the specified functionality.

In FIG. 4, the logical operation of the FLASH memory optimization is illustrated. The FLASH is represented as a combination of two logical stacks each facing opposite directions (shown respectively as 4(a) and 4(d) where the stack opening faces downward and 4(b) and 4(c) where the stack opening faces upward.) FIG. 4(a) represents transactions being pushed, or logged, into the FLASH memory through a downward facing stack. FIG. 4(a) corresponds to sequential ordered logging of transactions as represented by the procedure illustrated in FIG. 2. The earlier transactions, which are pushed from the top to the bottom of the down facing stack, appear to reside at the top of the FLASH memory while the more recent transactions are nearer the bottom of the FLASH memory, just as in sequential logging.

When used herein, references to the "top" of a stack refer to the open end of the stack while references to the "bottom" of the stack refer to the closed end of the stack as illustrated in FIGS. 4(a) through 4(d).

Sequential logging, as represented in FIG. 2, requires that the operation of writing transactions be explained as proceeding in a downward direction (namely from the numerically first addressable block which sits at the top of the stack to the penultimate block at the bottom of the stack). This is a necessary programming constraint because the addresses of the individual blocks of FLASH memory are fixed and are numbered in a sequential fashion. Logically, however, the act of pushing data into a stack corresponds exactly to the act of filling sequentially numbered addressed blocks from the top of the stack with its opening facing downwards while still maintaining the time relation between the transactions (i.e. earlier transactions in the lowered numbered blocks—or top of the downward facing stack—and the more recent transactions in the higher numbered blocks—or blocks at the bottom of the downward facing stack.) Most importantly to note, however, is that the ordered nature of the contents of the FLASH memory is the same using either representation.

Figure 4A:
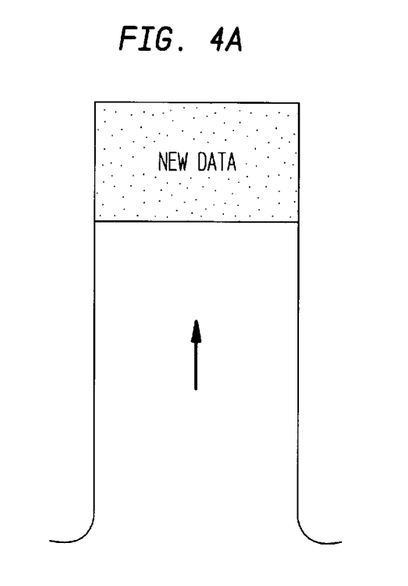
FIGS. 4(a) through 4(d) present a logical representation of a FLASH memory comprising two oppositely facing logical stacks at various stages of the FLASH optimization process.
Figure 4B:
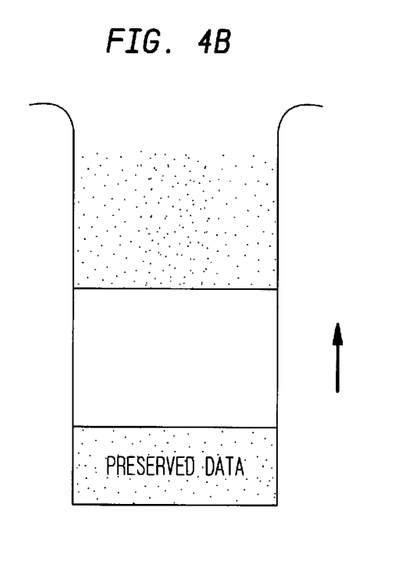

FIG. 4(b) represents the direction in which garbage collection proceeds after the pushed transactions have filled all but one block of the downward facing stack of FIG. 4(a). This process corresponds to reverse ordered garbage collection, the method of which is illustrated in FIG. 3. Notice that, in a logical representation, the direction of garbage collection proceeds in the same direction as the most previous push operation, in this case, from the top to the bottom of the downward facing stack. However, as is illustrated in FIG. 4(b), the preserved transactions are pushed (or written) to the bottom of a second stack during the garbage collection cycle. The opening of the second stack faces upwards.

Figure 4C:
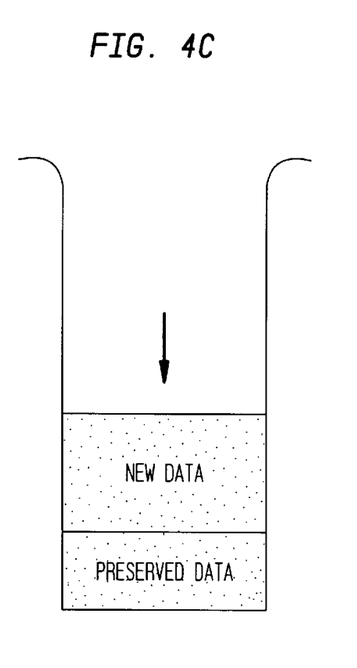

At the conclusion of the garbage collection cycle represented in FIG. 4(b), all of the preserved transactions will be stored at the bottom of the upward facing stack and new transactions will appear to be pushed into the available blocks of FLASH memory. However, as represented in FIG. 4(c), the new transactions will be pushed onto the stack from a direction opposite that in FIG. 4(a), namely from the top to the bottom of the upward facing stack. Hence, the two way nature of the logical FLASH memory stack is utilized to efficiently receive and store data.

The procedure illustrated logically in FIG. 4(c) corresponds to the method for reverse sequential logging illustrated (with the modifications as detailed above) in FIG. 2. As in reverse sequential logging, the earlier transactions reside nearer the bottom of the upward facing stack while the more recent transactions are at the top of the upward facing stack. However, where in reverse sequential logging, the procedure was described as proceeding in an upward direction (i.e., from the numerically larger addressable blocks to the numerically smaller addressable blocks or from the high-end to the low-end addresses ), logically, garbage collection proceeds from the top to the bottom of the upward facing stack of FIG. 4(c). Again, however, the result using either representation is the same.

Figure 4D:
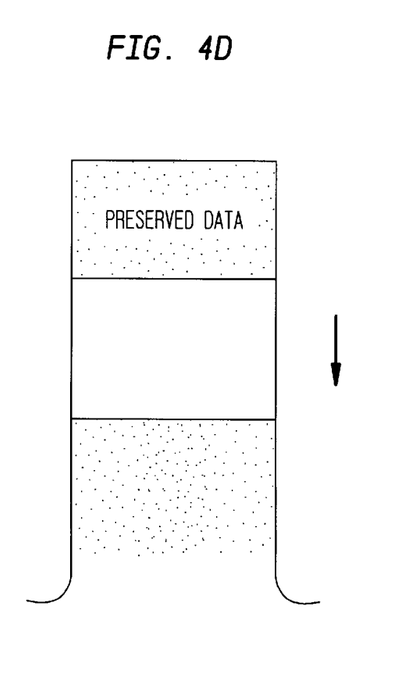

FIG. 4(d) logically represents sequential ordered garbage collection as illustrated in FIG. 3 (with the modifications as explained above). Notice, again, that, logically, the direction of the garbage collection method proceeds in the same direction as in the most recent write cycle (i.e. from top to bottom of the FLASH memory as in FIG. 4(c).) At the conclusion of the garbage collection cycle represented by FIG. 4(d), preserved data will have been pushed to the bottom of the downward facing stack. New data may then be pushed into the stack from the opening of the downward facing stack as shown in FIG. 4(a).

Logically, FLASH memory optimization is achieved by cycling through the operations represented in FIGS. 4(a)

through 4(d) until the database being supported is written to a permanent storage facility at which point the data residing in the logical FLASH stack can be popped out of the stack and new transactions can be pushed into the FLASH from the top to the bottom of the downward facing stack as in FIG. 4(a).

The purpose of logging transactions to the FLASH memory is to provide a means for updating a RAM-stored database whose contents may be lost due to a power failure. In such an instance, the contents of the database stored on the permanent storage device represent the data of the database as that data existed at the point in time when the entire contents of the database were last written to the storage device. Furthermore, at the instance of power failure, the FLASH memory will contain a log of all of the transactions which had been performed on that data since the point in time when that data was last written to the permanent storage device. Accordingly, in keeping with this method, there is no need to maintain transactions in FLASH memory after the contents of the database contained in RAM have been written to permanent storage 16 such that the entire contents of FLASH memory may be erased upon such backup and new transactions can then be logged to FLASH.

As previously noted, in accordance with the present method and system, the contents of that portion of the database contained in RAM is periodically written in its entirety to permanent storage, for example, a hard disk drive 16, a remote permanent storage facility or to the FLASH memory itself. Such a backup may be performed as required by the user or programmer and will depend, of course, upon system requirements, the amount of data in the database and the frequency of database operations. For example, if, following garbage collection, the amount of preserved data exceeds the useable storage capacity of the FLASH memory, a backup must be forced. Upon such backup, the transactions stored on the FLASH memory may be erased and new transactions subsequently sequentially logged to the FLASH memory in accordance with the procedure as detailed in FIG. 2 and 3.

The method of recreating a database lost due to power failure requires that the contents of the database stored in permanent memory be updated by the contents of the FLASH memory. Accordingly, upon reestablishment of power to the database system following a power loss, the CPU 12 writes the contents of the database stored on the permanent storage device 16 to RAM 12 memory. The CPU 12 then performs a garbage collection cycle (either in sequence or reverse-sequence order) upon the FLASH memory contents. Once completed, the CPU updates the database in RAM memory by processing the transactions contained in the FLASH memory and updating the database memory in RAM 12 accordingly. Upon completing the update of the database, the entire contents of the database are preferably written to the storage device, the FLASH memory is erased and the user or remote system can again begin to process data, the transactions of which are then logged to FLASH memory in accordance with the method described above.

Turning to FIG. 5, an example of the method is presented. For purposes of illustration, the example will log only one transaction in each block of FLASH memory effectively bypassing step 207. Of course, since a record will usually be much smaller than a block of FLASH memory, hundreds, if not thousands of transactions can be stored in each block of FLASH memory during normal operation. In this example, a system as represented in FIG. 1 runs a database program whereby a series of data elements are continuously updated by a user sitting at a keyboard and terminal connected or networked to the elements of the system. Alternately, a database program runs on an embedded system which, likewise, comprises the elements of FIG. 1 and whereby the database is continuously updated by a series of inputs provided by an offsite network such as a telephone operations monitoring network. In either case, a complete or partial instance of the database is resident on RAM and a user or off-site network continuously makes changes to the database using insert, update and delete commands. The particular record in RAM is modified pursuant to each command issued to the system. After such modification is performed, a copy of that particular transaction is written to a block of FLASH memory.

Figure 5A:
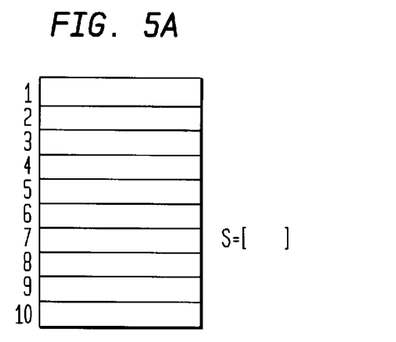
FIGS. 5(a) through 5(g) present a representation of an addressable FLASH memory at various stages of the FLASH memory optimization process.
Figure 5B:
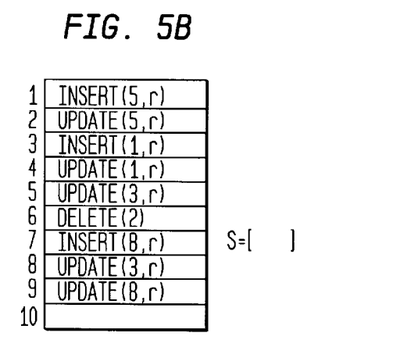

FIG. 5(a) is a logical representation of a blank FLASH memory prior to logging. The FLASH memory (for example purposes) has 10 blocks (n=10) which are addressed from 1 to 10. The CPU sequentially writes nine transactions to the FLASH memory in the form of <operator(record_id,data)> starting with <insert(5,r)> in block 1 and ending with <update(8,r)> in block 9, such that at the end of the ninth transaction the FLASH memory logically appears as in FIG. 5(b). In other words, FIG. 5(b) represents the FLASH memory after the user or off-site network has performed nine modifications on the RAM 12 resident database. The FLASH memory represented by FIG. 5(b) contains a complete transaction log of those nine modifications. Because each transaction was written to FLASH in sequential order starting with the first block and ending with the ninth or penultimate block 9, the transactions logged in the addressably higher ordered blocks, e.g. 9, at the bottom chronologically represent the more recently performed modifications than those in the lower numbered block, e.g., 1 at the top. In fact, the ordinal relation between the addressable position in FLASH memory of the logged transactions is inversely proportional to the time relation of the transaction. Accordingly, the transaction in the ninth block of FLASH memory (<update (8,r)>) modified the database after the transaction stored in the eighth block of FLASH memory (<update (3,r)>).

A more important relation to note for purposes of the present example and for purposes of understanding the present invention, however, is that the transaction stored in the ninth block of FLASH memory (<update (8,r)>) represents a change to the record identified by record_id (8) which occurred at a time later than the change to that record represented in the seventh block of FLASH memory (<insert (8,r)>). This is due to the sequential logging of the transactions which starts with the first block. As will be demonstrated, the function of recording the record_id pertaining to the particular transaction, which represents the most recent change to any particular record, will be performed by S. In accordance with this functionality, the array S is empty at the point in time represented by FIG. 5(b) which exemplifies FLASH memory and the array S prior to commencement of the garbage collection cycle. At this point, because the penultimate block (the ninth block) has been written to, transaction logging halts and the garbage collection cycle begins.

Figure 5C:
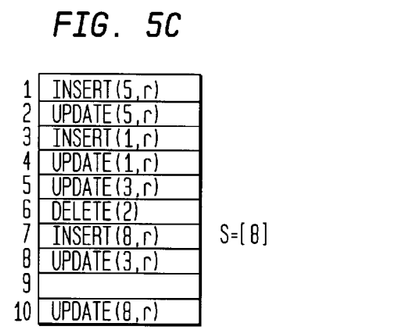

Garbage collection begins when the CPU inspects the record_id of the 9th block (8) and compares it with the array S looking for a match. Finding none, the record_id (8) is written to S and the transaction <update(8,r)> is written to the addressably last (10th) block. Block 9 is then erased. FIG. 5(c) is a logical representation of the FLASH memory and the array S after garbage collection has been performed on the 9th block. Array S now contains a log of the record_ids representing the records which have been encountered thus far during the garbage collection process. These record_ids therefore identify those transactions representing the most recent modification to that record. At the point in time represented in FIG. 5(c), only the record_id (8) has been written to the array S. Because the record_id (8) is now contained in the array S, should another transaction be encountered during the garbage collection cycle pertaining to record 8, reference to the array S informs the garbage collection process that a more recent transaction related to record (8) has already been encountered and preserved.

Figure 5D:
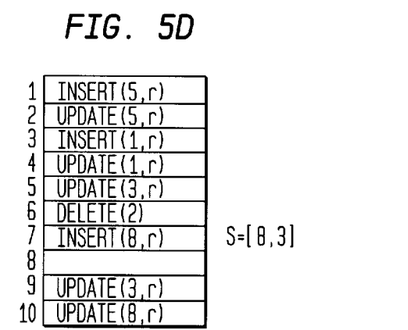

The CPU next inspects the record_id of the 8th block (3) and compares it with the array S looking for a match. Finding none, the record_id (3) is written to S and the transaction <update(3,r)> is written to the 9th block. Block 8 is then erased. FIG. 5(d) is a logical representation of the FLASH memory and the array S after garbage collection has been performed on the 8th block. Note that in addition to containing record_id (8), the array also now contains the record_id (3). Thus, the array S, shows that the most recent transactions pertaining to records identified by record_ids (8) and (3) have been encountered and preserved and, accordingly, any subsequent encounter, during the garbage collection cycle, of other transactions pertaining to either of these record_ids can be discarded.

Figure 5E:
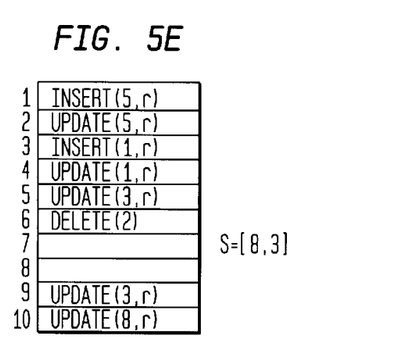

The CPU next inspects the record_id of the $7^{th}$ block (8) and compares it with the array S looking for a match. The CPU finds that the record_id (8) is already in S, therefore the contents of the $7^{th}$ block are not written to the $8^{th}$ block. In particular, because data was written to the FLASH memory in sequential order from block 1 to block 10, the data in block 7 is not as current as the data that was in block 9. The $7^{th}$ block is therefore erased. FIG. 5(e) is a logical representation of the FLASH memory and the array S after garbage collection has been performed on the $7^{th}$ block.

Figure 5F:
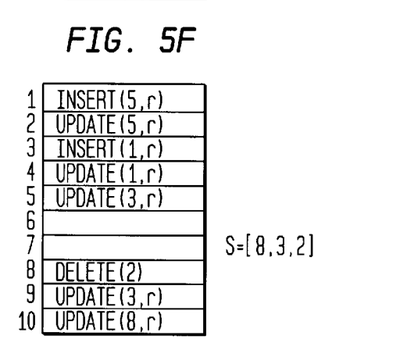

The CPU then inspects the record_id of the 6th block (2) and compares it with the array S looking for a match. Finding none, the record_id (2) is written to S. The transaction is then written to the first available block in reverse sequential order. In this example, the transaction is written to the $8^{th}$ block. Block 6 is then erased. FIG. 5(f) is a logical representation of the FLASH memory and the array S after garbage collection has been performed on the 6th block.

Figure 5G:
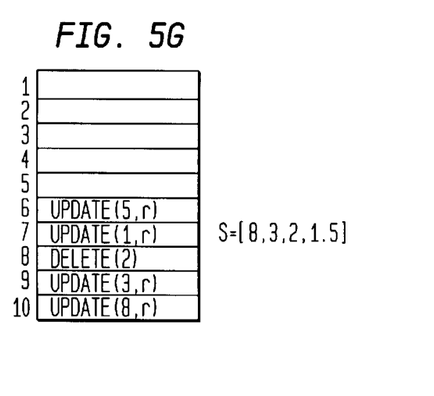

The garbage collection cycle continues to operate upon the FLASH memory blocks in reverse sequential order. FIG. 5(g) is a logical representation of the FLASH memory and the array S after the garbage collection cycle has been performed upon all of the blocks. Note that transaction of any one particular record remains in the FLASH memory after the garbage collection cycle is completed. This is because, upon encountering each transaction, the CPU referenced the contents of the array S which had recorded every record_id already encountered at each particular instance during the garbage collection cycle. Whenever the process encountered a transaction identified by a record_id resident in S, that transaction was discarded. Accordingly, only one instance of any particular record remains in FLASH at the end of the garbage collection cycle as shown in FIG. 5(g). At this point, the CPU again begins to log transactions to the FLASH memory starting with the $5^{th}$ block and continuing in reverse sequential order. Logging is performed in conformance with the procedure illustrated in FIG. 2 with the modifications described above for reverse order sequential logging starting with the $5^{th}$ block. At the conclusion of reverse sequential logging (after writing to the $2^{nd}$ block) a sequential order garbage collection cycle will be performed in accordance with the procedure illustrated in FIG. 3 with the modifications described above.

It is to be understood that in the present embodiment of the invention, the update transaction contains all of the fields of the record, including those that are not actually changed by the particular update transaction being logged. It is only in this way that retaining the last update performed on any particular record will capture all of the previous updates which may have been performed but which are not retained during the garbage collection cycle.

By utilizing the system and method described above, the life of the FLASH memory is extended in that the overall number of ERASE commands issued to a FLASH memory acting as a database backup are evenly distributed among all of the blocks of the FLASH memory. In other known embodiments, more than one transaction is stored in any particular block and often the entire block is filled before a subsequent block is written to. Consequently, the filled block must be erased and rewritten any time a particular record stored in that block is updated. In the case of a relatively small records (e.g. 100 bytes) stored in a relatively large block (e.g., 64 kBytes) any particular block being utilized in the FLASH memory may be erased and rewritten thousands of times before a subsequent block of FLASH memory is written to. The sequential logging and garbage collection cycles advantageously write transactions and performs garbage collection on each block in a sequential manner, thus evenly distributing the ERASE command cycle and therefore extending the useful life of the FLASH memory.

Additionally, the presently disclosed apparatus and method achieve a higher FLASH memory utilization rate over those methods known in the art. Because the present method and apparatus fills n−1 blocks of the FLASH memory (n representing the total number of blocks of FLASH memory) before initializing a garbage collection cycle, an efficiency index of (n−1)/n is achieved. Therefore, as FLASH memories with increasing number of memory blocks are utilized with the present invention, the backup efficiency ratio of the FLASH memory approaches 1 (i.e, 100%) thus greatly exceeding the backup efficiency ratios of known methods in the art.

Although the preferred embodiments have been disclosed for illustrative purposes, those skilled in the art will appreciate that many additions, modifications and substitutions are possible without departing from the scope and spirit of the invention as defined by the accompanying claims.

What is claimed is:

1. A method for storing data in data blocks of predetermined size in an electronic memory, comprising the steps of:
    (a) writing data, in a first direction, into addressably contiguous data blocks of said electronic memory; and
    (b) after writing to a predetermined data block, performing a garbage-collection cycle on said data blocks in a second direction which is opposite said first direction, whereby non-superfluous data is preserved in addressably contiguous data blocks of said electronic memory.

2. The method of claim 1, wherein said first direction is in an addressably sequential order and said garbage collection cycle is performed in an addressably reverse sequential order.

3. The method of claim 1, wherein said first direction is in an addressably reverse sequential order and said garbage collection cycle is performed in an addressably sequential order.

4. The method of claim 1, comprising the further steps of:
    (c) reversing each said first and second directions; and
    (d) repeating steps (a) and (b).

5. The method of claim 1 wherein said electronic memory is a FLASH memory.

6. The method of claim 1 further includes the steps of storing data as a database in a power dependent primary memory and modifying the data in the database in response to comments and wherein said electronic memory is power independent and the data in the datablocks of said electronic memory are a copy of modifications to said database.

7. The method of claim 6 further including the step of periodically storing a copy of said database in a power independent secondary memory and erasing the data in the datablocks of said electronic memory thereafter.

8. The method of claim 6 further including the steps of restoring the database to said power dependent primary memory after a power failure by writing the contents of the copy of said database from the secondary memory to said primary memory and modifying the copy of said data in said primary memory with the data from said electronic memory.

9. The method of claim 4, wherein said data includes a record_id which identifies a particular record in a database of records and wherein said garbage collection cycle includes the steps of:

reading the record_id of a record contained in a data block of said electronic memory;

determining whether the record corresponding to said record_id has already been encountered during the instant garbage collection cycle;

preserving said record if said record_id has not already been encountered during the instant collection cycle.

10. The method of claim 9 including the additional steps of:

setting a predetermined variable to correspond to the address of that data block in said electronic memory which is addressably contiguous in the direction of the cycle to the data block in which said record was instantly preserved.

11. The method of claim 10 wherein said addressably contiguous address comprises a sequentially smaller address when performing reverse sequential order garbage collection and a sequentially greater address when performing sequential order garbage collection.

12. The method of claim 9 wherein said step of reading said record_id proceeds in an addressably reverse sequential order starting with the addressably penultimate block of said electronic memory following a sequential write cycle.

13. The method of claim 9, wherein said step of reading said record_id proceeds in an addressably sequential order starting with the addressably second block of said electronic memory following a reverse sequential write cycle.

14. The method of claim 9 wherein, during a reverse sequential garbage collection cycle, said preserved record is written to the highest addressably ordered block in said electronic memory which does not presently contain preserved data.

15. The method of claim 9 wherein, during a sequential order garbage collection cycle, said preserved record is written to the lowest addressably ordered block in said electronic memory which does not presently contain preserved data.

16. The method of claim 9 wherein said step determining whether a record corresponding to said record_id has already been encountered is accomplished by:

storing the first instance of the record_id of each transaction encountered during the garbage collection cycle in a memory array and comparing subsequent record_ids stored in the memory array.

17. A method for writing data to blocks of predetermined size within an electronic memory, said electronic memory comprising two logical stacks whose openings face a first and a second direction, comprising the steps of:

(a) pushing new data into said stack facing said first direction until all but one block is filled;

(b) performing in said first direction a garbage collection cycle to identify non-superfluous data residing in said stack; and (c) pushing said non-superfluous data into said stack facing said second direction which is opposite said first direction.

18. The method of claim 17, comprising the further steps of:

(d) reversing said first and second directions and (e) repeating steps (a) and (b) and (c).

19. The method of claim 17 comprising the additional steps of:

(d) writing the data in said electronic memory to a permanent storage memory unit; and thereafter, (e) erasing all of said data from said electronic memory.

20. The method of claim 17 wherein said electronic memory is a FLASH memory.

21. A system for maintaining data in an electronic database comprising:

(a) a power dependent primary memory which stores said database;

(b) a power independent secondary memory comprising two logical stacks of memory blocks each facing one of a first and second direction onto which data is pushed;

(c) a logical processing unit programmed to modify said database in response to a command and to carry out a data log operation by pushing data indicative of the modification onto the logical stack of said secondary memory facing a first direction until all but one block is filled, performing a garbage collection cycle in said first direction to identify non-superfluous data residing in said stack, pushing said non-superfluous data in a second stack facing said second direction which is opposite said first direction and reversing the first direction with the second direction and continuing said data log operation;

(d) a permanent data store connected to said logical processing unit; and (e) a timer having a predetermined timer interval, said timer being connected to said logical processing unit and causing said data in said primary memory to transfer to said permanent store in response to the passage of said predetermined interval.

22. The system of claim 21 further comprising a sensor for sensing when the amount of preserved data in said secondary memory exceeds a predetermined capacity and causing said data in said primary memory to transfer to said primary store in response to an indication from said sensor due to sensing said predetermined criteria.

23. The system of claim 16 wherein said secondary memory comprises FLASH memory.

24. The system of claim 16 wherein said primary memory comprises RAM memory.

25. The system of claim 23, wherein after a power failure the database is removed by said logical processing unit reading data of the database from said permanent data stored to said primary memory and modifying said data in such primary memory with the data in said secondary memory.

* * * * *